June 17, 1941.   F. POSTMA   2,245,820
ABRADING DEVICE
Filed Jan. 15, 1941
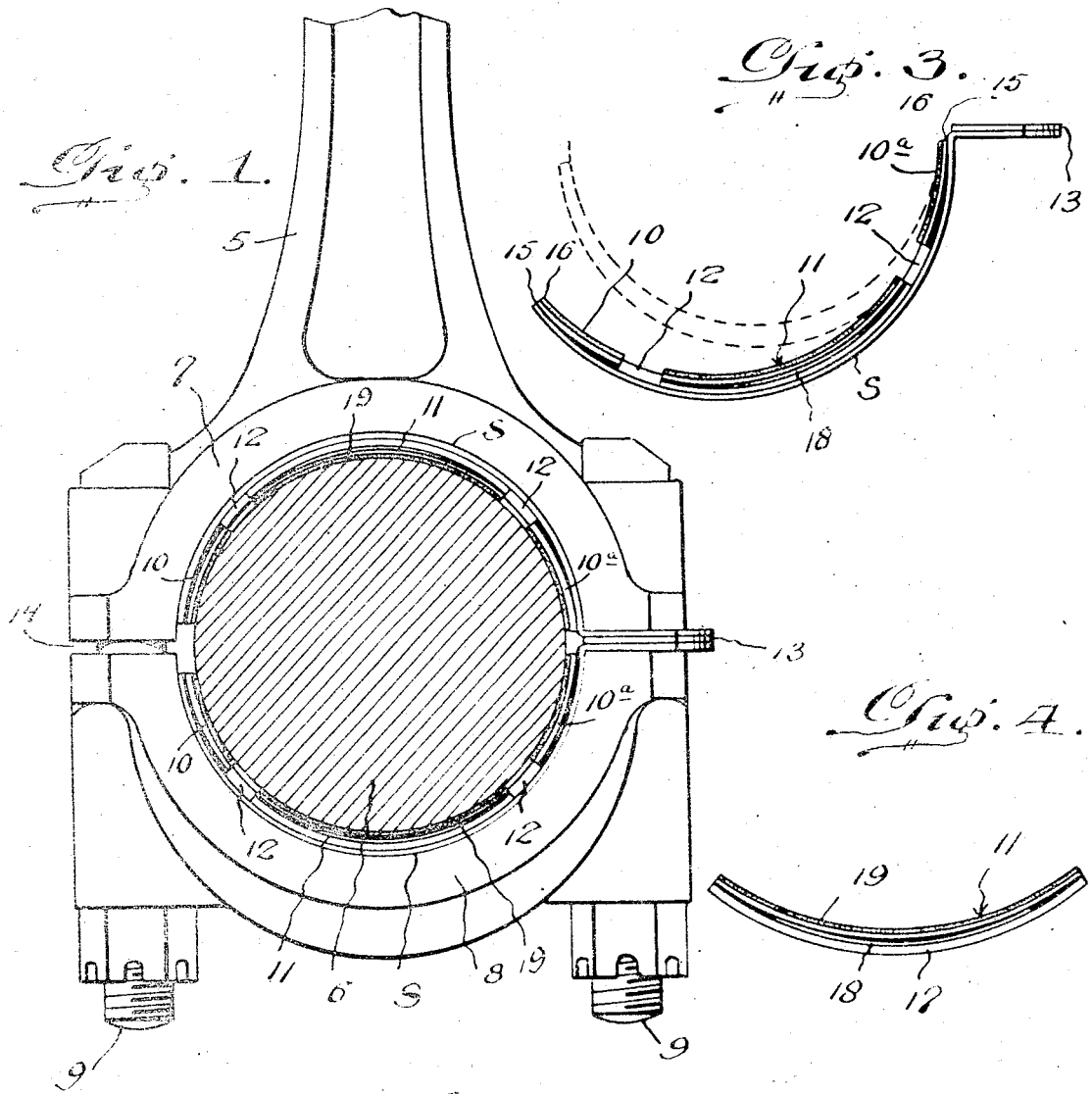
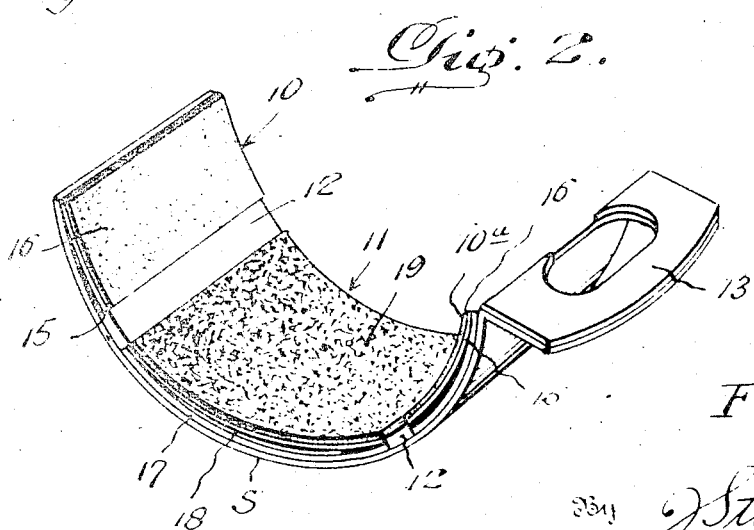
Inventor
Frank Postma,
by J. Stanley Burch
Attorney Patented June 17, 1941

2,245,820

UNITED STATES PATENT OFFICE 2,245,820

ABRADING DEVICE

Frank Postma, Glen Rock, N. J.

Application January 15, 1941, Serial No. 374,573

3 Claims. (Cl. 51—185)

This invention relates to devices for abrading and thereby truing worn crank pins of crank shafts for internal combustion engines and the like, without removing the crank shaft from the engine, and has more particular reference to improved abrading liners of the type adapted to be substituted for the bearing liners of the engine connecting rod as generally disclosed in my U. S. Letters Patents No. 2,153,272 dated April 4, 1939, and No. 2,167,312, dated July 25, 1939.

An object of the present invention is to provide abrading liners of the above kind which are extremely durable and efficient, and which have intermediate abrading elements that may be readily applied or removed as required and that taper gradually to increased thickness from the ends to a point intermediate the ends thereof.

A more specific object of the present invention is to provide abrading liners consisting of a pair of arcuate members adapted to be retained in correct positions with respect to each other and the connecting rod bearings by means of shims integral with corresponding ends of the arcuate members and interposed between the sections of the connecting rod bearing, intermediate abrading elements of the arcuate members being removable and tapered gradually to increased thickness from the ends to a point intermediate the ends thereof so as to take up the clearance between the upper and lower portions of the crank pin and the connecting rod bearing due to adjustment of the connecting rod bearing out of round when the sims are placed between the sections of the connecting rod bearing.

More particularly, the present invention aims to provide abrading liners of the above kind including a pair of arcuate members, each composed of a thin flexible outer carrier shell having a plurality of recesses or seats in the inner surface thereof in which flexible end and intermediate abrading elements are secured, the shell being of uniform thickness at the recesses. The recesses for the intermediate abrading elements are in the form of transverse grooves or guideways which removably receive said intermediate abrading elements, and each of said intermediate abrading elements preferably consists of a curved sheet composed of a backing in the form of a thin flexible backing sheet having a layer of paper adhesively secured to the inner surface thereof, and a layer of abrading material applied to the inner surface of said paper layer and the ends of said backing sheet so that the resultant abrading element gradually increases in thickness from the ends to a point intermediate the ends thereof.

Other objects and features of the present invention will become apparent from the following description when considered in connection with the accompanying drawing, wherein:

Figure 1 is a fragmentary view partly in elevation and partly in section, showing an engine connecting rod having a bearing provided with abrading liners embodying the present invention.

Figure 2 is a perspective view of one of the abrading liners employed in Figure 1.

Figure 3 is an edge elevational view thereof; and

Figure 4 is an edge elevational view of the intermediate abrading element forming part of the liner shown in Figure 2.

Referring in detail to the drawing, 5 indicates an engine connecting rod having a bearing on the lower end thereof in which is journaled the crank pin 6 of the engine crank shaft. As is well known in the art, the bearing includes a half bearing or bearing block 7 integral with the lower end of the connecting rod and a separate half bearing or bearing cap 8 detachably bolted as at 9 to the bearing block 7.

In accordance with the present invention, improved abrading liners, conforming in general size and shape to the usual bearing liners of the connecting rod bearing, are provided for substitution for such usual bearing liners. Each abrading liner consists of an arcuate member embodying a thin flexible outer carrier shell S adapted to seat against the inner surface of one of the bearing sections and provided on its inner surface with an arcuate series of abrading elements 10, 10a, and 11. These abrading elements are of the same width as the bearing and are resilient and flexible as well as curved to substantially conform to the curvature of the carrier shell S. Each carrier shell is formed with a transverse guideway or seat defined between transverse ribs 12 and adapted to removably receive the abrading element 11 so that the latter snugly fits and is retained in the guideway or seat by the tension of the abrading element and its frictional engagement with the sides of the ribs 12. The abrading element 11 may be readily inserted or removed by sliding the same transversely with respect to the associated carrier shell S or by flexing the latter toward a straighter condition when the abrading liner is out of the connecting rod bearing. The carrier shell S has a shim 13 integral with one end thereof and is devoid of an integral shim at the other end thereof, the shim 13 being of increased thickness with respect to the thickness of the shell S between the ribs 12, as regards one of the two abrading liners employed in connection with a particular connecting rod bearing when grinding the crank pin journaled therein. This provides the necessary clearance even though the shell S and one thickness of the shim 13 integrally formed therewith are of quite thin metal. When two bearing liners are employed in the connecting rod bearing as shown in Figure 1, the shims of both liners are disposed between the same ends of the connecting rod bearing sections, no shims being placed between the remaining corresponding ends of the bearing sections. This leaves sufficient clearance as at 14 to permit the ends of the bearing at one side to be drawn together as the grinding operation proceeds. Also, it will be apparent that the liner sections may be employed with bearings of many different sizes, it being immaterial that the ends of the liners having no shims may not come together and may be spaced various distances apart when employed in different sized bearings.

Each abrading element 10 and 10a consists of a thin flexible backing sheet 15 having granular abrading material or abrading cloth applied to the inner surface thereof. These end abrading elements 10 and 10a are preferably permanently secured to the ends of the shell S as they do not perform a great amount of abrading work in use and will last a long period of time without renewal. In other words, the major part of the abrading operation is performed by the intermediate abrading elements 11, and the latter are accordingly made removable so that they may be readily renewed at the frequent intervals required. Preferably, the intermediate abrading elements 11 are of a coarser nature than the end abrading elements 10 and 10a, although the intermediate abrading elements may be used in various grit sizes.

The intermediate abrading elements 11 are tapered gradually to increased thickness from the ends to a point intermediate the ends thereof so as to take up the clearance between the upper and lower portions of the crank pin and the connecting rod bearing due to adjustment of the connecting rod bearing out of round when the shims 13 are placed between the sections of the connecting rod bearing. Each of said intermediate abrading elements 11 preferably consists of a curved sheet composed of a backing in the form of a flexible backing sheet tapered thinner toward its ends or a backing sheet of uniform thickness as at 17 having a layer of paper 18 adhesively secured to the central portion of the inner surface thereof, and a layer of abrading material or abrading cloth 19 applied to the inner surface of tapered backing sheet or of said paper layer 18 and the ends of said backing sheet 17, so that the resultant abrading element gradually increases in thickness from the ends to a point intermediate the ends thereof as stated. By tapering this removable abrading element in this way, the carrier shell S may be made of thin flexible material of substantially uniform thickness throughout except at the ribs 12, but thin enough to be used in connecting rods where clearances are very small. The tapered abrasive insert is therefore of great importance, and the same carrier shells may be used continuously with periodical replacement of the intermediate abrasive inserts. Preferably, the abrading liner is of a springy nature and normally tensioned to expand to an arcuate form of greater curvature than that of the bearing section in which it is to be used. Thus, the abrading liner will be flexed from its normal condition as shown by full lines in Figure 3 to the dotted line position of this figure when placed within the connecting rod bearing. This insures intimate contact with the inner surface of the bearing section and proper conformation of the abrading liner to the crank pin when the bearing sections of the connecting rod are bolted in place.

In use, the abrading liners are placed in the bearing and clamped or bolted therein by the bolts 9, whereupon the crank shaft is rotated by any suitable means so as to subject the journal or crank pin of the crank shaft to the abrading action of the abrading liners. As the abrading operation proceeds, the clearance 14 at one side of the bearing may be taken up, and the intermediate abrading elements 11 may be renewed as found necessary.

From the foregoing description, it will be seen that I have provided efficient abrading liners which will be economical to manufacture, as well as convenient to use and highly efficient in operation. Minor changes in the specific details illustrated and described are contemplated within the spirit and scope of the invention as claimed.

What I claim as new is:

1. As a new article of manufacture, abrading liners for engine crank shaft bearings, consisting of a pair of arcuate outer carrier shells of relatively thin flexible metal adapted to seat against the bore of the bearing and having transverse recesses in the inner faces thereof intermediate the ends of the same, said carrier shells having shims integral with corresponding ends thereof and having their other ends devoid of shims, and end and intermediate abrading elements secured on the inner faces of said carrier shells, said intermediate abrading elements being removably disposed in said recesses and composed of thin flexible members having abrading inner surfaces and tapering thicker from the ends to a point intermediate the ends thereof.

2. As a new article of manufacture, abrading liners for engine crank shaft bearings, consisting of a pair of arcuate outer carrier shells of relatively thin flexible metal adapted to seat against the bore of the bearing and having transverse recesses in the inner faces thereof intermediate the ends of the same, said carrier shells having shims integral with corresponding ends thereof and having their other ends devoid of shims, and end and intermediate abrading elements secured on the inner faces of said carrier shells, said intermediate abrading elements being removably disposed in said recesses and composed of thin flexible members having abrading inner surfaces and tapering thicker from the ends to a point intermediate the ends thereof, said end abrading elements being of a less coarse nature than the intermediate abrading elements and permanently secured in place.

3. As a new article of manufacture, abrading liners for engine crank shaft bearings, consisting of a pair of arcuate outer carrier shells of relatively thin flexible metal adapted to seat against the bore of the bearing and having transverse recesses in the inner faces thereof intermediate the ends of the same, said carrier shells having shims integral with corresponding ends thereof and having their other ends devoid of shims, and end and intermediate abrading elements secured on the inner faces of said carrier shells said intermediate abrading elements being removably disposed in said recesses and composed of thin flexible members having abrading inner surfaces and tapering thicker from the ends to a point intermediate the ends thereof, said flexible member consisting of a backing in the form of a thin flexible backing sheet having a layer of paper adhesively secured to the central portion of the inner surface thereof and a layer of abrading material applied to the inner surface of said paper layer and the ends of said backing sheet.

FRANK POSTMA.